United States Patent [19]

Stoner

[11] 4,207,929
[45] Jun. 17, 1980

[54] METHOD AND APPARATUS FOR DISPENSING MEASURED QUANTITIES OF MATERIAL

[75] Inventor: Larry W. Stoner, Fort Wayne, Ind.

[73] Assignee: General Electric Company, Fort Wayne, Ind.

[21] Appl. No.: 946,553

[22] Filed: Sep. 28, 1978

[51] Int. Cl.² .......................... B65B 3/12; B65B 3/32
[52] U.S. Cl. ...................................... 141/1; 137/563; 141/27; 141/284; 222/137; 222/381; 417/516
[58] Field of Search ................. 137/563; 141/1, 2, 11, 141/94, 129, 172, 181, 238, 242, 258, 270, 284, 18, 21, 25, 27; 184/1 D; 222/137, 380, 381, 424; 264/328; 417/510, 515, 516; 425/129 R, 567, 569, 574, 256

[56] References Cited

U.S. PATENT DOCUMENTS

| | | | |
|---|---|---|---|
| 2,966,459 | 12/1960 | Abel | 252/14 |
| 3,053,421 | 9/1962 | Abel | 222/250 |
| 3,096,914 | 7/1963 | Kerr | 222/380 X |
| 3,221,948 | 12/1965 | Kalist | 222/334 |
| 3,226,801 | 1/1966 | Abel | 29/149.5 |
| 3,268,638 | 8/1966 | Tann | 264/69 |
| 3,466,244 | 9/1969 | Abel | 252/14 |
| 3,765,575 | 10/1973 | Abel | 222/227 |
| 3,774,721 | 11/1973 | Hollowell | 184/10 |
| 3,894,956 | 7/1975 | Whitt | 252/14 |

*Primary Examiner*—Frederick R. Schmidt
*Attorney, Agent, or Firm*—Ralph E. Krisher, Jr.

[57] ABSTRACT

A material metering device and method for repetitively charging consistently accurate quantity charges of a lubricant retaining and wicking material to lubricant reservoirs of dynamoelectric machine bearings. A metering head is movably supported on a base for motion toward and away from a bearing and its support while both are held in alignment with the metering head. The metering head includes a dispensing chamber which may be sealingly coupled to the bearing support structure. The chamber receives lubricant retaining material from a source with excess material returning to the source. A valving arrangement interrupts the supply of material without substantially changing either the volume or pressure of the material in the dispensing chamber. An evacuation passage material flow path from the chamber to the bearing support structure or other workpiece is established and the material is extruded from the chamber. One preferred method includes supplying a compressible mixture of lubricant and wicking material to a chamber under consistent conditions, isolating the chamber from the mixture supply, opening an evacuation port for evacuating the chamber, evacuating a preselected amount of material from the chamber, and closing the evacuation port without concomitantly causing or contributing to the evacuation of residual amounts of material from the chamber or from evacuation passages.

6 Claims, 9 Drawing Figures

U.S. Patent Jun. 17, 1980 Sheet 3 of 3 4,207,929
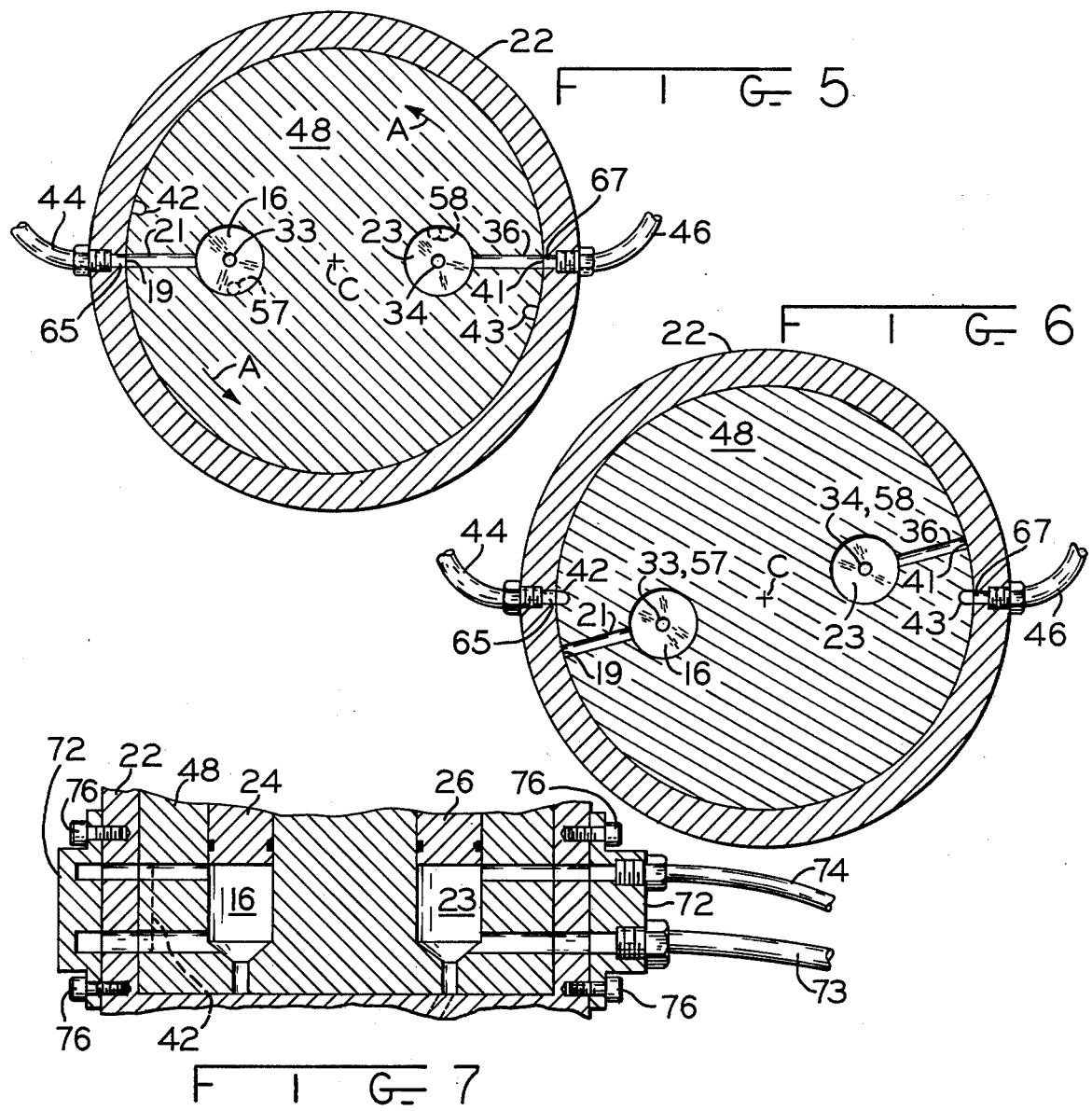
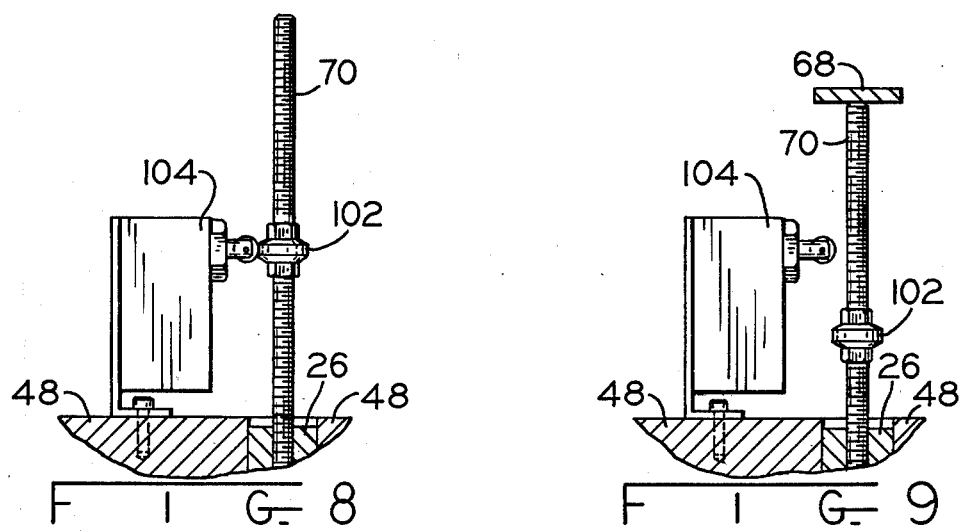

METHOD AND APPARATUS FOR DISPENSING MEASURED QUANTITIES OF MATERIAL

BACKGROUND OF THE INVENTION

The present invention relates generally to methods and apparatus for charging lubricant retaining and wicking material in consistent amounts, even when such material is readily compressible, into bearing lubricant reservoirs-including for example, bearing reservoirs of fractional horsepower motors.

In many material handling and moving applications, materials that are readily compressible or damaged are typically dispensed or metered by weight. On the other hand, materials that are pressurized and dispensed on a volume basis are either: (1) generally incompressible; (2) not adversely affected by pressurization or compression if they are in fact compressible; or (3) of a type such that non-consistent volumetric charges caused by compressive dispensing processes, are tolerable.

One specific area of technology in which the compressibility of a weight or volumetrically dispensed material is significant is that which involves dispensing compressible lubricant storage materials into bearing lubricant reservoirs for small electric motors or generators. In this type of application, small quantities of material are charged into the bearing lubricant reservoir, and excess material quickly causes problems—both during and after motor assembly. For example, excess material can cause problems ranging from those associated with cleaning up excess material at the dispensing station or subsequent motor assembly stations, to those associated with excess oil dripping from a finally assembled motor, or flowing into the motor interior. As will be understood, these conditions are unacceptable from handling and appearance standpoints and also because future leakage paths for oil from the reservoir may be established.

In the above-mentioned specific area of technology, the materials that may be satisfactorily used for the application are rather limited in number. This is explained in more detail hereinafter, but for the present it is noted that the material must be such that it satisfies motor lubricant lubricating characteristics, that a sufficient amount of oil is released at acceptable flow rates for an acceptable period of time, and so that the oil does not inadvertently drip out of the motor. Moreover, the materials known to applicant as acceptable for this type of application can easily be deleteriously affected as a result of mishandling during a compressive dispensing process.

Exemplary specific examples of extrudable or flowable lubricating materials particularly adapted for fractional horsepower motor use are those that are made according to the commonly assigned Whitt U.S. Pat. No. 3,894,956 dated July 15, 1975; and those made pursuant to Abel U.S. Pat. No. 2,966,459 of Dec. 27, 1960, the entire disclosures of which are incorporated herein by reference. These lubricating materials (also sometimes referred to as wicking materials) include a lubricant mixed with a lubricant retaining material-such material being referred to herein as a carrier or matrix material. Numerous problems arise in dispensing lubricating materials of this type because squeezing the material can cause the lubricant to flow out of the matrix. In fact, settling or separation of the oil from the carrier or matrix usually occurs with time simply due to bulk storage under static conditions.

The prior art recognizes and documents oil and matrix separation (as well as other metering problems) that occur when delivering this type of material to a metering or dispensing mechanism, and that also occur as the result of operation of the dispensing mechanism itself.

For example, Abel U.S. Pat. No. 3,053,421 (of Sept. 11, 1962) points out that variations in pressure exerted on extrudable wicking or lubricating materials can cause variations in "the ratio of the lubricating oil to the wicking material". Abel then goes on to describe by-pass or pressure relief valves and by-pass conduits, and a free piston metering device as important aspects of solving the separation problem. As another example, Tann U.S. Pat. No. 3,268,638 (of Aug. 23, 1966) stresses the separation problems associated with lubricant compositions of the type contemplated herein; and Tann suggests the use of vibratory techniques because of this problem.

The just-mentioned Tann patent illustrates what Tann describes as a metering and injection device wherein a pair of pistons are movable along a common bore. Material trapped between the two pistons is then dispensed into a lubricant reservoir or a bearing. The Tann arrangement, in addition to being one where the lubricant flow is not continuous (i.e., the flow is interrupted during each dispensing step); also provides for relative movement between the two pistons (which tends to separate the pistons) during a "retraction" stroke, with an injection or upper piston moving away from a lower or "metering head" piston. This relative movement in turn would appear to cause the creation of air pockets or voids between the co-acting end faces of the two pistons, or a suction which would tend to withdraw lubricant material in a reverse flow direction along a passage along the piston which forms the dispensing head or nozzle.

U.S. Pat. No. 3,221,948 to Kalist illustrates yet another structure wherein opposed movable pistons in a common bore are used to meter and dispense lubricating material. The structural elements used by Kalist are very similar to those of Tann, but the mode of operation of the Kalist structure is somewhat different from the Tann structure (discussed hereinabove). For example, with the Kalist approach, after a metered amount of lubricant has been dispensed, a lower piston associated with a dispensing head is moved in a "retracting" direction, and an upper piston is then moved in response to the movement of the lower piston. However, depending on which particular structure shown by Kalist is to be used (and in any event whenever the quantity of material actually dispensed is less than the maximum amount that could be dispensed) relative axial movement of the Kalist pistons will also occur. This relative movement with the Kalist structure is distinguished from the relative movement of Tann, in that the Kalist pistons tend to move toward one another and thus compress material trapped therebetween as the metering device retracts after material has been dispensed. This, in turn, can tend to cause oil per se or an oil-wicking mixture to exude from the metering head. This exuding material would be excess material that would cause the various problems mentioned hereinabove. In addition, any oil per se being exuded from the Kalist structure would alter the ratio of oil to matrix remaining in the Kalist structure.

At least the approach illustrated by Kalist has been utilized commercially long prior to the present invention and more than one year prior to this application. That commercially available equipment has included one or more cylinders having a pair of spaced apart movable pistons therein, and the separation between adjacent piston ends defines a volume intended to be substantially the same as the volume of a lubricant reservoir into which material is to be dispensed. The equipment under discussion also apparently follows the Kalist approach by using inlet and overflow ports in the cylinder side wall so that material may be supplied to a region between the two pistons through the inlet port and pass from such region through the outlet or overflow port. Thus, a substantially continuous circulation of material is maintained to assist in avoiding oil separation. In this equipment (as in the the Kalist patent), the material is transferred from the metering head to a workpiece by moving an upper piston so as to close off the overflow outlet, close the inlet port, and isolate a charge of material between the two pistons. Continued movement of the first piston compressively moves the oil/matrix material which in turn forces the lower piston to move until the lower piston exposes an outlet port. Thereupon the lower piston ceases movement, and continued movement of the first piston forces the charge of material through the outlet port to the workpiece.

Since the prior art mechanisms of which applicant is aware rely solely on axial motion for valving as well as injecting forces, and due to the inherent design of such mechanisms, the dispensing of material at inappropriate times in the form of material dribbling from the injection head can occur, resulting in a messy and wasteful operation, and potential departure from the desired proper oil to matrix ratio.

It should now be understood that it would be desirable to provide new and improved methods of metering extrudable lubricants, and apparatus useful in practicing such methods; so that precisely controlled amounts of such material may be metered, so that unwanted exudates may be minimized or eliminated, and so that unwanted separation of a lubricant and lubricant carrier is minimized, if not eliminated.

SUMMARY OF THE INVENTION

Accordingly, it is an object of the present invention to provide new and improved methods and apparatus for metering and extruding lubricant materials whereby the difficulties and problems associated with the prior art are overcome.

A more specific object of the present invention is to provide new and improved methods and apparatus for dispensing extrudable lubricants whereby a material flow path is closed or interrupted at the end of a metering or dispensing procedure without the closing or interrupting procedure itself introducing a pressure gradient across material in the metering system.

A more specific object of the present invention is to provide new and improved methods and apparatus for compressively extruding lubricant material from a metering device and for isolating the source of the material from discharge paths until the discharge paths have been completely closed at the conclusion of a metered discharge step.

Yet another object of the present invention is to provide new and improved methods and apparatus whereby a metering head is moved axially toward and away from a lubricant reservoir defining structure without inducing a pressure gradient across extrudable lubricant retained in the metering head.

Still other objects of the present invention include the provision of dispensing methods and apparatus characterized by reliability, consistency of results, and reduction of dispensed material waste; the provision of a material dispensing method wherein flow control techniques are essentially independent of the means utilized for expelling material from a chamber or for moving the dispensing mechanism to a dispensing position; and the provision of dispensing methods and apparatus wherein control of the flow of material from a source, and movement of a dispenser to and from a dispensing position is an isobaric process vis-a-vis material in a metering chamber.

In carrying out the above and other objects of the invention, in one preferred form thereof, I provide a method of dispensing or metering measured or predetermined charges of a compressible lubricant composition to a lubricant reservoir of a motor by supplying the composition, under pressure, through a passageway in open material receiving relationship with a source of lubricant material and to a dispensing chamber cavity in order to fill the chamber with material. I then stop the flow of material into the dispensing chamber inlet while maintaining the pressure but preferably without increasing the pressure on the material in the chamber, and maintain the mass of material within the volume defined by the chamber substantially constant. At the time I stop the material flow to the chamber, I also preferably change the condition of an overflow outlet. I also establish a material dispensing outlet from the chamber without affecting the pressure in the chamber. In other words, I maintain an isobaric condition in the chamber while stopping the flow of material into the dispensing chamber inlet port. Thereafter, I compressively urge predetermined quantities of material from the chamber through a dispensing outlet and to the workpiece under the influence of axially movable plunger means. When an excess material overflow outlet from the chamber to the material supply source is employed, material may be supplied to the chamber continuously after it is filled. Closing of the excess material overflow outlet after the chamber is filled isolates a charge of material in the chamber and in the preferred method, the volume defined by the chamber cavity is maintained constant during closure of the overflow port.

Alternatively, movement of the plunger means or dispensing pistons may be used as the sole means for closing the excess material overflow ports (in the same manner as shown in Kalist or the prior commercial equipment discussed hereinabove). In that event, closure of the excess material overflow ports will be accompanied by application of pressure to material in the cavity, but this is not unduly objectionable.

After a charge has been dispensed, the chamber inlet is reconnected to the material source. Material then again is supplied through the inlet, causing a chamber piston to move toward an overflow port. As the chamber attains a refilled condition, the piston passes by and exposes the overflow outlet or port, and the chamber is then ready for a subsequent dispensing operation. A plurality of bearing lubricant cavities may be supported during the preferred process, with one of the cavities positioned to receive dispensed material. Then, during the chamber refilling process, the supported and filled cavity may be moved away, and a different supported cavity moved into position to receive oil storage material.

In one form of an embodiment of the invention, a material metering device for repetitively dispensing or metering consistent predetermined quantity charges of a compressible lubricating material to a series of end shield supported dynamoelectric machine bearings and bearing lubricant reservoirs includes a device which includes a metering or injection head and an arrangement for relatively axially moving the metering head and an end shield so as to mate the metering head with an axially aligned supported end shield in a material transfer relation. The device also includes means for periodically moving end shields toward and away from the metering head. Material may be supplied from a material source to the chamber in a recirculating manner, and overflow material from the chamber may be returned to the material source. This recirculating supply through the chamber may then be interrupted just prior to a material dispensing operation without substantially changing the volume of or the pressure on the material in the chamber. Preferably, such interruption occurs without moving the chamber toward the end shield. In the most preferred forms, rotary means are utilized in conjunction with an axially movable dispensing mechanism. When this mechanism includes a reciprocating piston, the rotary valving operation is operable independently of piston reciprocation.

The rotary means include a structural arrangement that permits relative rotary movement between one or more metering chambers and means that selectively establish a discharge path for the chamber or a path for the flow of material from the supply source into the chamber. In preferred forms, structural arrangements embodying the invention are operative to selectively block the flow of material into the chamber from the material supply, and establish a discharge path for metered material from the chamber into a bearing lubricant reservoir. Then, after metering or injection of the material, the discharge path is disconnected from open communication with the chamber, and the flow of material from the material supply or source into the metering chamber is re-established.

The subject matter which is regarded as my invention is particularly pointed out and distinctly claimed in the concluding portion of this specification. The invention itself, however, together with further objects and advantages thereof, may be best understood by reference to the following description taken in conjunction with the accompanying drawings wherein like reference numerals have been utilized to denote like parts.

BRIEF DESCRIPTION OF THE DRAWINGS

FIG. 5 is a view along the section line 5—5 with the apparatus conditioned for receipt of material into the dispensing chamber;

FIG. 6 is a view similar to FIG. 5 but with the apparatus conditioned for the discharging of material from the dispensing chamber;

FIG. 7 is a sectional view illustrating a modification to a portion of the apparatus shown in FIG. 1;

FIG. 8 is a side elevation, with parts in section and with parts removed, of the structure shown in FIG. 2; and FIG. 9 is a view similar to FIG. 8 but illustrating parts in different relative positions.

DESCRIPTION OF THE PREFERRED EMBODIMENTS

Figure 1:
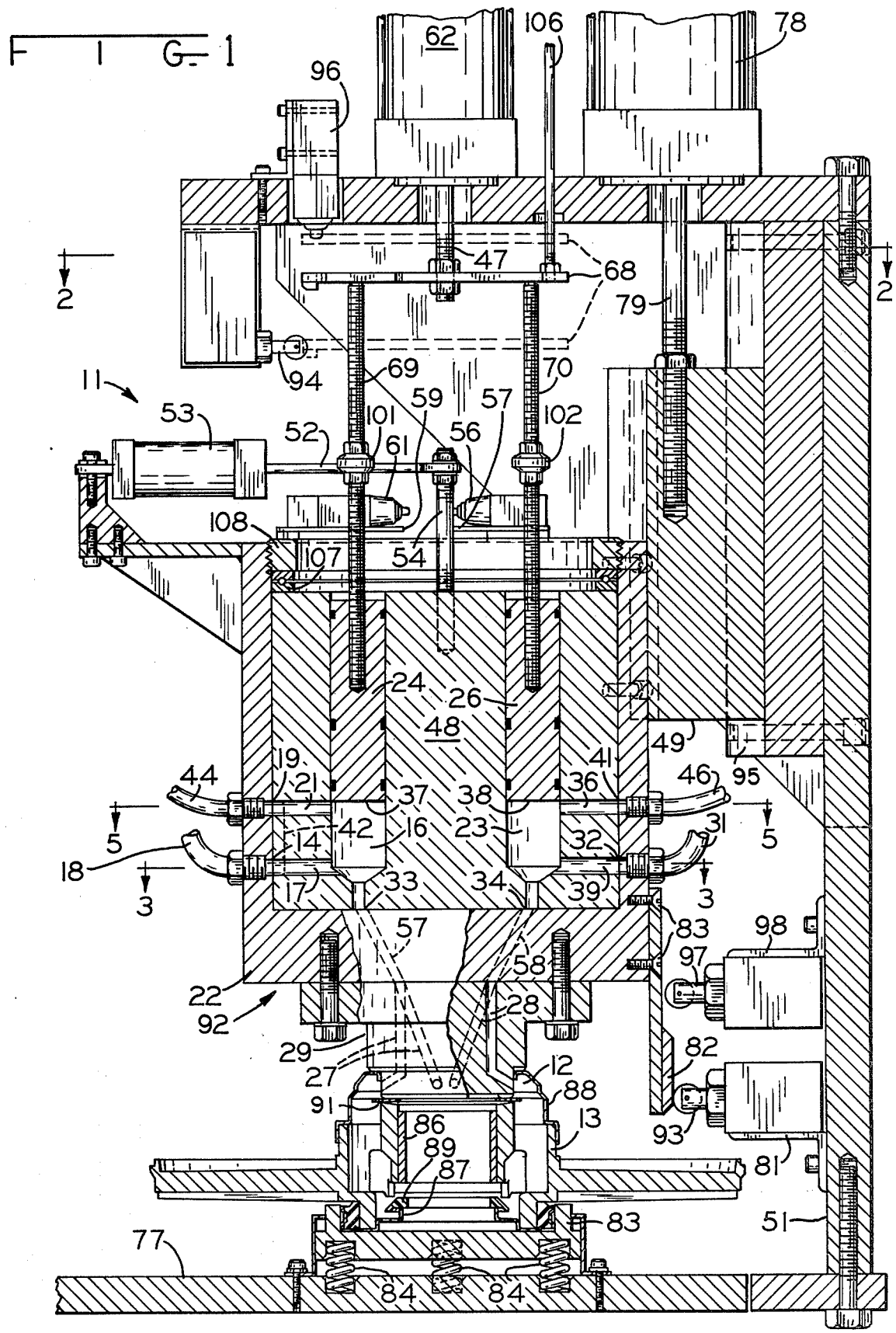
FIG. 1 is a front elevation, with parts removed, parts broken away, and parts in section, of apparatus embodying one form of the invention that may be used to practice the invention in one preferred form.

With general reference now to the drawings, a method is provided in one form of the invention that includes dispensing measured charges of material (e.g., from the apparatus 11) into a bearing lubricant reservoir (e.g., reservoir 12 of motor end frame 13). Material is supplied to the inlet 14 and into a dispensing chamber 16 by means of a conduit 18 and a material admitting passage 17.

The conduit 18 is connected to an appropriate source of material. Such source may be the transmission and pump of equipment such as that shown in FIG. 3 of Abel U.S. Pat. No. 3,053,421; or a pump as disclosed in the commonly assigned co-pending application Ser. No. 946,554 which was filed on the same day as this application in the names of James M. Tomson and Richard C. Bohde, and entitled "Lubricant Transmission Pump". The entire disclosures of the just-mentioned Abel patent and Tomson et al application are specifically incorporated herein by reference. This Tomson et al. application Ser. No. 946,554 application explicitly also incorporates therein by reference the entire disclosures of Tomson and Bonde application Ser. No. 946,569 and Tomson application Ser. No. 946,568, both of which were filed on the same day as this application.

A material overflow or outlet port 19 is also provided which returns material to the supply source from discharge passage 21 to discharge conduit 44. Thus, material may be continually supplied to the chamber 16 and recirculated to the supply-provided that the circulation path through chamber 16 is not obstructed and that the inlet and outlet ports are not closed. This type of arrangement can be of advantage for reasons now known in the art—i.e., to prevent separation of oil and matrix material while the apparatus 11 is idle.

In the apparatus 11, the outlet port 19 and inlet port 14 may be substantially simultaneously controlled by rotary action valve means that cut across the flow path of the material. This is accomplished by relatively moving the ports 14, 19, and valve means that are illustrated herein as body 22.

During operation of the apparatus 11, bearing lubricant material is metered in predetermined amounts to bearing lubricant reservoirs from the dispensing chambers 16, 23. At this point, it should be noted that two virtually identical dispensing chambers are shown in FIG. 1, but that a single chamber or more than two chambers may be used while practicing my invention. The actual number of chambers to be used will depend however on the relative maximum volumes of the chambers and the lubricant reservoirs, the complexity of the discharge path into the lubricant reservoirs and through nozzle means, and the user's choice.

Still having reference to FIG. 1, it will be noted that the chambers 16, 23 are elongate, and also cylindrical in shape (although a particular shape is not critical with regard to the inventive principles disclosed herein); and plunger means in the form of pistons 24, 26 movable axially within the chambers are operative to force lubricant material from the chambers along discharge paths 27, 28 defined by discharge nozzle means which are illustrated as a single nozzle 29.

The dispensing chambers 16, 23 have port means that are selectively connectable with the discharge nozzle means, or with a lubricant supply through the conduits 18, 31. In the illustrated embodiment, such port means comprise inlets 14, 32 that are selectively connectable with the conduits 18, 31 (and thus the lubricant material source or supply), and also comprise outlets 33, 34 which are selectively connectable with the nozzle 29. The selective connection of the port means with the discharge nozzle means and lubricant material supply is accomplished in the apparatus 11 by valve means which include the body 22 as it is relatively rotated with respect to the chambers 16, 23.

When the valve means is in a selected position relative to the chambers 16, 23 such that the passageways 17, 39 are in open material receiving relationship with the conduits 18, 31 and thus the source or supply of lubricant material; lubricant material is moved into the chambers 16, 23 by flowing (under pressure from the material supply) into cavities defined by the respective dispensing chambers 16, 23 and the plunger means (for example, faces 37, 38 of the pistons 24, 26). As the lubricant material flows into these cavities, the pistons move upwardly until the discharge passages 21, 36 are exposed. Thereafter, while lubricant material continues to be supplied by conduits 18, 31, the lubricant material overflows through passageways 21, 36 and overflow outlets 19, 41. In FIG. 1, the pistons 24, 26 are illustrated in a first axial position relative to the chambers 16, 23 such that the volume of the cavities under the piston faces 37, 38 is a maximum, and the lubricant material flowing into the cavities 16, 23 holds the pistons in the first position.

At the time that lubricant material is to be moved out of the cavities 16, 23 and into the discharge paths 27, 28; the open material receiving relationship of the chambers 16, 23 and the material supply is changed to a closed relationship, and the flow of material into the chambers is interrupted. However, material may continue to be delivered from conduit 18 into bypass means (see phantom line passage 42 in FIG. 1, and passages 42, 43 in FIGS. 5 and 6) and thence to return conduits 44, 46, all as will be discussed in substantially more detail hereinbelow. The pistons 24, 26 remain in the first relative axial position while the folow of material into chambers 16, 23 is interrupted, and continue to remain in such position until an open material discharge path from the cavity is established for discharge of material from the nozzle means. By holding the pistons in the first position, pressure is not exerted by the pistons on the material in the cavity during the valving sequence just described. At the end of the valving sequence, the plunger means are moved downwardly along the chambers 16, 23 to decrease the cavity volumes and discharge lubricant material. At the end of the piston stroke, piston movement is arrested, and the pistons remain fixed at a bottom (or second) relative axial position while another valving sequence takes place which re-establishes the open material receiving relationship between chambers 16, 23 and the material supplying conduits 18, 31. By this time, of course, the discharge path will also have been closed. The pistons then move upwardly and increase the cavity volumes as lubricant material is supplied to the chambers 16, 23.

The valving sequences mentioned above are accomplished without concomitant movement of the pistons 24, 26. More specifically, relative movement of rotary body 22 and metering block 48 about a vertical axis (as viewed in the top center in FIG. 1, an axis generally along the axis of main cylinder rod 47, and thus parallel to a line along the longitudinal extent of chambers 16, 23 and thus also parallel to the line of movement of the plunger means causes the chambers 16, 23 to be selectively connected to the supply conduits or discharge paths. In the apparatus 11, the body or frame 22 is fastened to a vertical slide block 49 (see FIG. 2) and thus prevented from rotary movement relative to the machine frame 51. However, metering block 48 is fitted with a slip fit within body 22, and relative rotary movement of block 48 and body 22 is accomplished by extending or retracting the rod 52 of cylinder 53 and thereby rotating the metering block within body 22 (see FIGS. 2 and 1).

This relative rotation causes the previously discussed selective valving sequences. This may be better understood by considering together FIGS. 1-6.

Figure 2:
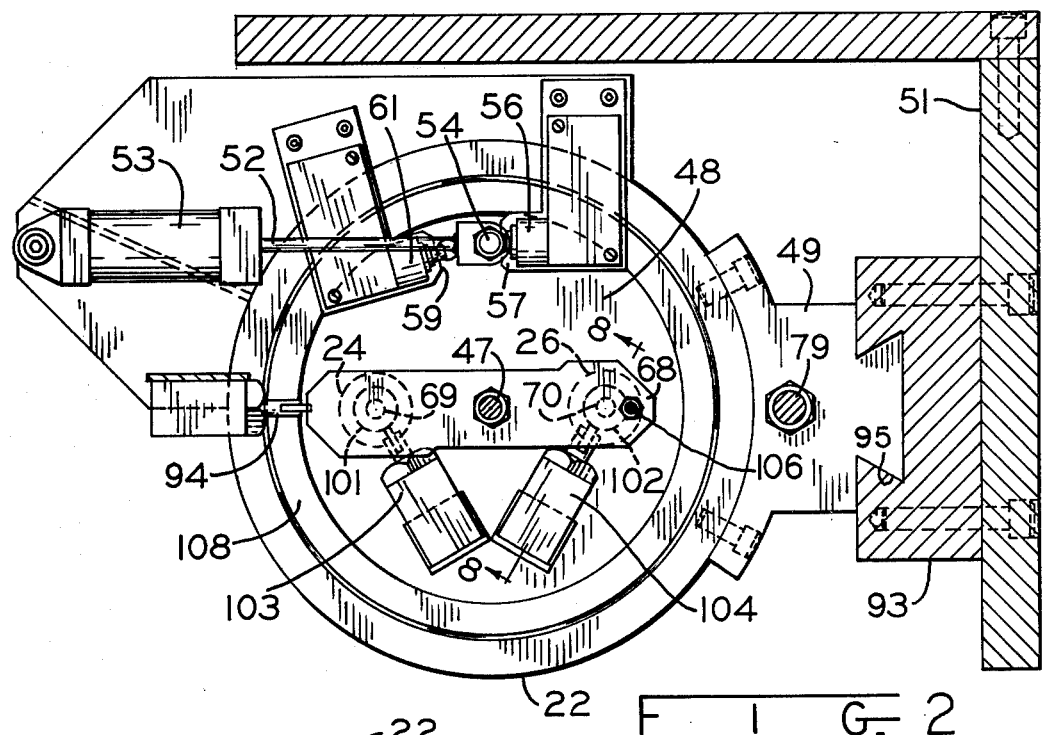
FIG. 2 is a view, with parts removed, taken along the section line 2—2 of FIG. 1.
Figure 3:
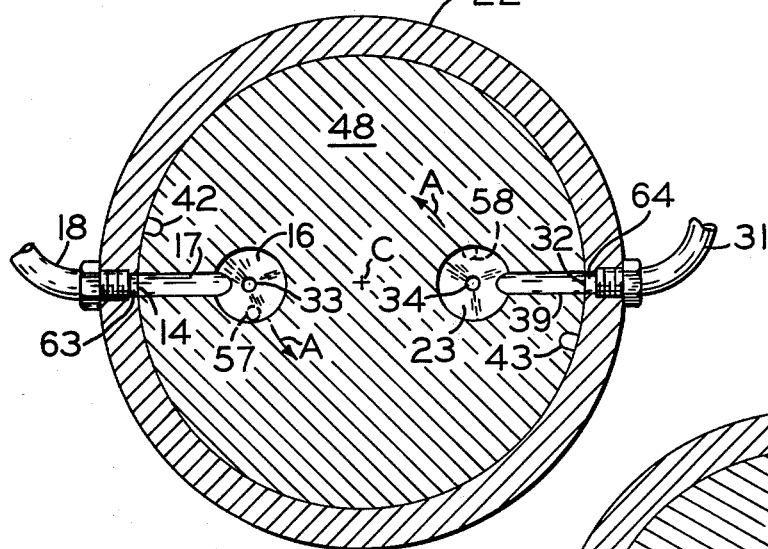
FIG. 3 is a view with parts removed, taken along section line 3—3 of FIG. 1 with the apparatus conditioned for filling the dispensing chamber with material.

The relative position of body 22 and block 48 in FIG. 1 is the same as that shown in FIGS. 2, 3, and 5, with the inlets 14, 32 open to supply conduits 18, 31; and the overflow outlets 19, 41 open to return conduits 44, 46. At this time, bypass passages 42, 43 are "closed", i.e., are not in material transferring communication with the supply or return conduits. Also at this time, and as will be discussed in more detail hereinbelow, drive arm 54 is in engagement with limit switch 56 and stop plate 59. Furthermore, with the parts in the relative positions shown in FIGS. 1-3 and 5, the outlets 33, 34 are "closed", i.e., not in open material transferring communication with discharge paths 57, 58 which paths extend through body 22 and remain in open material transferring communication with discharge paths 27, 28.

Figure 4:
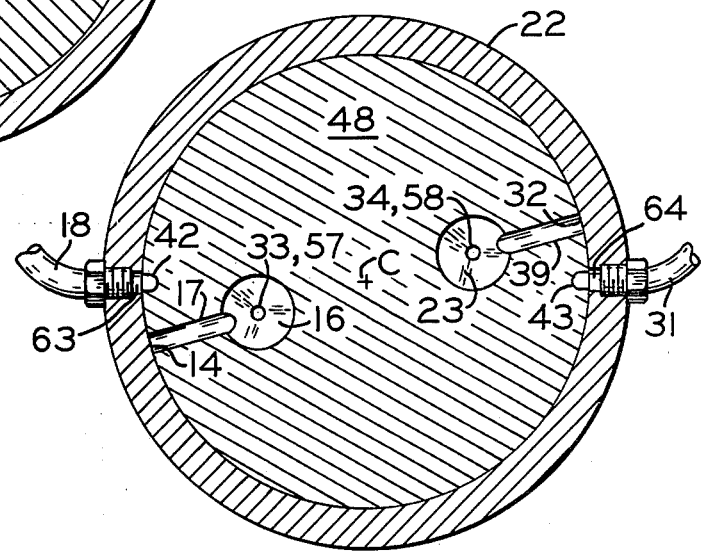
FIG. 4 is a view similar to FIG. 3 but with the apparatus conditioned for discharging material from the dispensing chamber.

When a quantity of material is to be metered from chambers 16, 23; cylinder 53 retracts and pulls drive arm 54 into engagement with stop plate 59 and limit switch 61. Closing of limit switch 61 by engagement of arm 54 enables actuation of cylinder 62 (as discussed in more detail hereinbelow). Metering block 48 moves under the influence of arms 54 and rotates in the direction of arrows "A" about center "C" until the ports are relatively aligned as shown in FIGS. 4 and 6. When the parts are positioned as shown in FIGS. 4 and 6, the drive arm 54 is in abutting relation with the stop plate 59, as will be understood.

With the parts positioned as illustrated in FIGS. 4 and 6, a material dispensing outlet path from the chamber is established with the outlets 33, 34 in the bottom of the chambers aligned with the discharge paths 57, 58. In addition, bypass passages 42, 43 now interconnect conduits 18, 44 and 31, 46 directly. Thus, relative rotation of metering block 48 and valve body 22 functions to disable the inlets 14, 32 and overflow outlets 19, 41 by simultaneously misaligning them relative to the conduit accommodating holes 63, 65, 66, and 67 outlet, while enabling the discharge paths 27, 28 (see FIG. 1) by aligning paths 57, 58 with outlets 33, 34 in the bottom of the chambers 16, 23 and while also enabling the bypass passages 42, 43. Material may now be urged from the chambers through the outlets 33, 34 by forcing the pistons 24, 26 axially along the chambers 16, 23 and toward the dispensing outlets 33, 34. This diminishes the chamber volumes and dispenses measured charges of material to the end frame 13. Upon completion of the dispensing step, the outlets 33, 34 are closed by rotating metering block 48 from its position relative to body 22 shown in FIGS. 4 and 6 back to its relative position shown in FIGS. 3 and 5. This also closes the bypass passages 42, 43 and opens the inlets 14, 32 and outlets 19, 41. Until this time, pistons 24, 26 remain in the "down" or second relative axial position, but introduction of material by way of the inlets 14, 32 now causes the pistons 24, 26 to move away from the outlets 33, 34 and to rise until they open the overflow outlets 19, 41. It will be noted that while the outlets 19, 41 were realigned with conduits 44, 46 by the movement of block 48, the pistons 24, 26 blocked the passages 21, 36 so as to effectively maintain the overflow outlets closed until the desired material charge has been replenished in the chambers and the pistons forced back up to the relative positions illustrated in FIG. 1.

Material is simultaneously urged from the chambers 16, 23 when pistons 24, 26 descend together under the force exerted by plate 68 engaging the two piston rods 69, 70. Plate 68 in turn is urged downwardly to extrude material from the chambers by actuation of main cylinder 62 by way of its rod 47. When the chambers 16, 23 are of the same diameter, equal charges are dispensed therefrom-assuming that both pistons 24, 26 are similarly positioned on their respective rods 69, 70. When a plurality of chambers are employed, it may be desirable to replace the inlet (and/or outlet) fittings with an annular material handling chamber 72 which receives material from a pump by way of supply line 73 and returns material via conduit 74 as illustrated in FIG. 7. When this is done, the chamber 72 may be fastened to body 22 with screws 76 as shown.

The illustrated metering apparatus provides the structure necessary to automate the process of the present invention while supplying lubricating material to workpieces or parts such as end frame 13. A plurality of such parts may be supported on a turntable 77 or other conveying arrangement so that a support workpiece may be positioned under the dispensing nozzle 29 in preparation for receiving the dispensed lubricating material. Indexing of the turntable 77 will present a different part to the dispensing device for receiving the dispensed material. Relative axial movement of the end frame 13 and dispensing device at the beginning of a dispensing subcycle is accomplished in the embodiment shown with hydraulic cylinder 78 which extends rod 79 and thus lowers slide block 49 until limit switch 81 is closed by a flag 82 that is fastened by screws 83 to body 22. This movement of slide 49 moves nozzle 29 into engagement with the end frame 13. As the nozzle seats in the end frame, the spring suspended nest 83 yields and compresses springs 84 to insure a leakage free fit between the nozzle and end frame without damage to the parts.

A signal from the actuated limit switch 81 then is used to energize cylinder 53 so that it retracts rod 52 and initiates the desired valving sequence to permit evacuation of the chambers 16, 23. When the rod 52 retracts, arm 54 moves against stop plate 59 and stops, and the outlets 33, 34 are properly aligned with discharge paths 57, 58. As the arm 54 stops against stop plate 59, it also actuates limit switch 61 and this then enables cylinder 62 to extend its rod 47 and thereby drive pistons 24, 26 downward in a material dispensing action. If desired, of course, a slight time delay may be provided which will prevent actuation of cylinder 62 until after the valving sequence is completed. If such a time delay arrangement is not utilized, then the relative positions of the limit switch 61 and stop plate 59 should be controlled with sufficiently close dimensional tolerances to assure that the outlets 33, 34 are "open" before cylinder 62 is actuated. Alternatively, the entrances of discharge paths 57, 58 may be flared open or otherwise enlarged to ensure that the outlets 33, 34 are unobstructed as the cylinder is actuated. If close dimensional tolerances are not maintained, if a time delay is not used, and if the entrances of paths 57, 58 are not enlarged, the apparatus 11 will still function as intended, but some slight extra compression of the material in chambers 16, 23 may occur at the beginning of the downward stroke of pistons 24, 26.

With known prior art devices discussed hereinabove, the procedure followed is to close an overflow outlet, substantially compress the measured quantity of material, and then close the inlet to the dispensing chamber. In contradistinction, rotation of the block 48 in the apparatus 11 substantially simultaneously closes the inlet and overflow outlets and virtually at the same time opens the dispensing or discharge outlet without movement of a compression piston so that the valving occurs without increasing the pressure on the compressible lubricating material due to the valving action itself. This procedure, without an increase in pressure, is referred to herein as an isobaric process.

Since knowledge of the details of end frame 13 are not necessary for an understanding of the present invention, it only is noted that the end shield 13 includes a sleeve bearing 86, an inner oil well cover 87, an outer oil well cover 88, an oil slinger 89, and a thrust plate 91. Lubricating material is supplied to this end shield by way of the four passages 27, 28 which communicate with the lubricant reservoir 12 through four openings in the oil well cover 88.

The illustrated apparatus includes the previously noted fixed frame 51 and a metering head 92 which includes, inter alia, the body 22 and metering block 48. The metering head 92 undergoes selective movement through the sliding dovetail connection between the track 95 (see FIGS. 2 and 1) and slide block 49. The actual motion is imparted to the metering head 92 by energizing the hydraulic cylinder 78 to retract or extend its piston rod 79, thereby raising or lowering the metering head 92. As the metering head 92 descends, the nozzle 29 engages the end frame 13 and depresses it somewhat against the springs 84 so that the end frame and metering head are mated in a material transfer relationship. The nozzle 29 may be easily removed and replaced by a differently configured nozzle or adapter to accommodate other end frames, as will be understood by persons skilled in the art.

As previously mentioned, when the dispensing head 92 is mated with the end shield, limit switch 81 is actuated by flag 82 engaging the limit switch actuator 93, and this provides a signal that the dispensing head is in its "down" position. This signal is then used to enable cylinder 53 as previously described.

After cylinder 53 performs its valving sequence, it is preferable for cylinder 62 to extend rod 47 and thereby dispense material by moving plate 68 to its dotted line lower position, and thereby trip limit switch 94 with plate 68. Thereupon, it is preferable that limit switch 94 automatically cause retraction of rod 47 and withdrawal of plate 68 to its uppermost position (illustrated by phantom lines in FIG. 1) whereupon limit switch 96 is tripped by plate 68. The signal from limit switch 96 then signals that a dispense subcycle is completed, and this enables cylinder 53 to extend rod 52 and move arm 54 against stop plate 57 at which time outlets 33, 34 are closed, and inlets 14, 32 are again supplied with material from the supply conduit means. The limit switch 56 provides a signal indicating that inlets 14, 32 are fully open and, if desired, limit switch 56 may be wired to also control the pump which supplies material to the supply conduit means. Thus, the pump would supply material when switch 56 was actuated, and dwell when switch 56 was not actuated. Although bypass passages 42 permit continuous operation of the supply pump, if it is not desired to operate the pump during dispensing subcycle, the switch 56 may be used as just described. In any event, when cylinder 53 extends rod 52, material starts filling chambers 16, 23 and the material moves pistons 24, 26 to their "up" position. Reverse actuation of the cylinder 78 occurs, preferably, after limit switch 56 is closed, and cylinder 78 then raises the dispensing head 92. Flag 82 then engages switch actuator 97 to provide from limit switch 98 an indication that the dispensing head is in its raised position, and turntable 77 is enabled for moving a new end frame under head 92. Chambers 16, 23 may be replenished with lubricant material when the dispensing head is up, down, or moving up, as will be understood. Thus, several overlapping steps in the preferred process may occur.

It should be noted that even when pistons 24, 26 are at the bottom of chambers 16, 23, material may be supplied under the faces of the pistons so as to raise them to their "up" position. This is provided for by having the material admitting passages 17, 39 located so that they can supply material under the faces 37, 38 of the pistons regardless of piston position.

When the pistons 24, 26 reach their uppermost position and the two chambers are replenished with lubricating material, the adjustable indicators 101, 102 carried by rods 69, 70 engage respective limit switches 103 and 104 (see FIGS. 8, 9, 2, and 1) to indicate a "chamber full" condition. Since the rods 69, 70 (and switches 103, 104) rotate with block 48, the rods may slide across the lower face of plate 68 at times. To prevent rotation of plate 68, a guide rod 106 is attached to and moves with the laterally extending plate 68. The rod 106 ensures that the plate 68 does not rotate about its actuating rod 47.

The assembly of metering block 48 and body 22 is apparent from the drawings, but for purposes of description, it is noted that block 48 is slipped into body 22, a ball bearing or any other suitable type of bearing 107 is positioned over the top of block 48, and a retaining ring 108 is threaded into body 22 against the bearing 107 in order to retain block 48 within the body 22.

From the foregoing it should now be apparent that a novel process and apparatus for dispensing compressible lubricating materials has been disclosed meeting the objects and advantageous features set out hereinbefore, and that modifications as to the precise configurations, shapes and details, as well as the precise steps of the method may be made by those having ordinary skill in the art without departing from the spirit of the invention.

What I claim as new and desire to secure by Letters Patent of the United States is:

1. A method of forcing predetermined amounts of a bearing lubricant into at least one bearing lubricant reservoir from apparatus comprising at least one axially extending dispensing chamber having port means selectively connectable with a discharge nozzle and a lubricant supply source and having plunger means axially movable along a line of movement therein for forcing quantities of lubricant therefrom, the apparatus further comprising a valve means relatively rotatable with respect to the at least one dispensing chamber about a predetermined axis generally parallel with the line of movement of the plunger means; the method comprising: flowing lubricant into the at least one dispensing chamber while it is in open material transferring communication with a lubricant source, until a quantity of the lubricant material fills a cavity defined by the at least one dispensing chamber and the plunger means with the plunger means located in a first axial position relative to the at least one dispensing chamber; effecting relative rotary movement, about the predetermined axis, of the valve means with respect to the at least one dispensing chamber and thereby blocking further flow of lubricant into the at least one dispensing chamber and establishing an open discharge path from the at least one dispensing chamber to the lubricant reservoir without moving the plunger means relative to the dispensing chamber; reducing the volume of the cavity and forcing lubricant along the open discharge path and into the lubricant reservoir; closing the discharge path without moving the plunger means relative to the dispensing chamber; re-establishing open material transferring communication between the at least one dispensing chamber and lubricant source by once again effecting relative rotary movement, about the predetermined axis, of the valve means with respect to the at least one dispensing chamber, and flowing lubricant into the at least one dispensing chamber while increasing the volume of the cavity.

2. The method of claim 1 wherein the valve means is interconnected with material supply inlet conduit means and discharge conduit means, and is supported by frame means to prevent rotary movement of the valve means relative to the frame means, the at least one dispensing chamber is disposed within a metering block, and the metering block is rotatable about the predetermined axis with respect to the valve means, inlet conduit means, and discharge conduit means, and wherein the method further comprsies: holding the valve means in fixed relation relative to an end frame while rotating the metering block relative to the valve means.

3. Apparatus for metering compressible bearing lubricant into at least one bearing lubricant reservoir wherein the apparatus comprises: a metering block having at least one axially extending dispensing chamber therein; plunger means axially movable along a line of movement in the at least one dispensing chamber; flow control means comprising a valve means relatively rotatable with respect to the at least one dispensing chamber about a predetermined axis generally parallel with the line of movement of the plunger means, said valve means being actuatable independently of movement of the plunger means along the dispensing chamber, for controlling the flow of material into and out of the dispensing chamber; and means for effecting relative rotary movement of the valve means and the metering block about the predetermined axis; said apparatus including port means for admitting material to the dispensing chamber, at least one material supply passage, and at least one material discharge passsage; and wherein the relative rotary movement between the valve means and dispensing chamber selectively interconnects the port means with the supply passage and with the material discharge path.

4. The apparatus of claim 3 wherein the metering block is supported by a machine frame and the flow control means comprises a structure held fixed against rotary movement relative to the machine frame, and wherein the apparatus further comprises means for rotating the metering block relative to the flow control means.

5. The apparatus of claim 3 wherein the apparatus further comprises means for permitting bypass flow of material relative to the plunger means while the plunger means are held in a first position relative to the dispensing chamber, and while the material supply passage is disconnected from the port means.

6. A material metering device adapted for mounting to selected machine frames and adapted for interconnection with a material supply wherein the metering device is particularly adapted for repetitively dispensing consistent quantity charges of a compressible lubricating material to lubricant reservoirs for dynamoelectric machine end shields; said apparatus including an injection head having a plurality of axially extending chambers therein, means for relatively axially moving the injection head and an end shield so as to mate the injection head with an axially aligned end shield in material transfer relation, an axially movable dispensing mechanism for forcing material axially from the chambers in the injection head, and valve means relatively rotatable about a predetermined axis generally parallel with the axially extending chambers, and operable independently of the axially movable dispensing mechanism for controlling valving operations that selectively interconnect the chambers in the injection head with a supply of material and with at least one discharge passage; said injection head including a metering block having the chambers therein and also including an axially movable piston disposed within each of the axially extending chambers; said valve means being held fixed in a rotational sense, and said metering block being rotatable relative to the valve means about the predetermined axis in order to effect the valving operations; said device further including material inlet port means connectable with conduit means and selectively connectable in material flow relationship with the chambers in response to the valving operations; and said valve means further including discharge passages that selectively are in material receiving relationship with the chambers in response to a valving action produced by the relative movement of the metering block and valve means.

* * * * *